(12) United States Patent
Jang

(10) Patent No.: US 11,205,951 B2
(45) Date of Patent: Dec. 21, 2021

(54) POWER CONVERSION DEVICE UTILIZING A RELAY UNIT WITH MULTIPLE RELAYS

(71) Applicant: LSIS CO., LTD., Anyang-si (KR)

(72) Inventor: Jae-Hoon Jang, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 161 days.

(21) Appl. No.: 16/611,914

(22) PCT Filed: Aug. 2, 2017

(86) PCT No.: PCT/KR2017/008352
§ 371 (c)(1),
(2) Date: Nov. 8, 2019

(87) PCT Pub. No.: WO2018/216850
PCT Pub. Date: Nov. 29, 2018

(65) Prior Publication Data
US 2021/0152079 A1 May 20, 2021

(30) Foreign Application Priority Data

May 23, 2017 (KR) ........................ 10-2017-0063280

(51) Int. Cl.
*H02M 1/36* (2007.01)
*H02M 7/537* (2006.01)
*H02P 27/06* (2006.01)

(52) U.S. Cl.
CPC ............. *H02M 1/36* (2013.01); *H02M 7/537* (2013.01); *H02P 27/06* (2013.01)

(58) Field of Classification Search
CPC ............. H02M 1/0003; H02M 1/0009; H02M 1/0083; H02M 1/14; H02M 1/143;
(Continued)

(56) References Cited

U.S. PATENT DOCUMENTS

| 8,228,037 B2 | 7/2012 | Furukawa et al. |
| 2010/0127663 A1 | 5/2010 | Furukawa et al. |

(Continued)

FOREIGN PATENT DOCUMENTS

| CN | 204367903 U | 6/2015 |
| EP | 3121056 A1 | 1/2017 |

(Continued)

OTHER PUBLICATIONS

European Search Report for related European Application No. 17977792.7; action dated Feb. 5, 2020; (7 pages).

(Continued)

*Primary Examiner* — Jue Zhang
*Assistant Examiner* — David A. Singh
(74) *Attorney, Agent, or Firm* — K&L Gates LLP

(57) ABSTRACT

A power conversion device comprises: a DC link capacitor charged with a DC power supplied from a power supply part; a fuse part, for breaking a current which is output from or supplied to the power supply part and has a first breaking magnitude or greater; a relay part which comprises a first relay for connecting a positive terminal of the fuse part to a positive terminal of the DC link capacitor and a second relay for connecting a negative terminal of the fuse part to a negative terminal of the DC link capacitor; an initial charge part, for charging the DC link capacitor by using DC power supplied from the power supply part; and a power conversion part for converting the direct-current power supplied from the power supply part into AC power when the DC link capacitor has been charged and supplying the alternating-current power to a load terminal.

7 Claims, 7 Drawing Sheets

(58) Field of Classification Search
CPC ............ H02M 1/15; H02M 1/32; H02M 1/36;
H02M 1/42; H02M 7/42; H02M 7/44;
H02M 7/48; H02M 7/53; H02M 7/537;
H02M 7/5375; H02P 27/05; H02P 27/06;
H02H 3/02; H02H 3/027; H02H 3/08;
H02J 1/00; H02J 1/002; H02J 1/02; H02J
3/88; H02J 7/0016; H02J 7/0026
See application file for complete search history.

(56) References Cited

U.S. PATENT DOCUMENTS

| 2011/0095765 | A1* | 4/2011 | Tae | G01R 31/396 |
| | | | | 324/434 |
| 2011/0181246 | A1* | 7/2011 | Tae | H02J 7/0014 |
| | | | | 320/118 |
| 2012/0169117 | A1* | 7/2012 | Park | B60L 58/10 |
| | | | | 307/10.7 |
| 2012/0281444 | A1* | 11/2012 | Dent | H02J 7/35 |
| | | | | 363/56.01 |
| 2013/0250641 | A1* | 9/2013 | Falk | H02J 3/383 |
| | | | | 363/131 |
| 2017/0025872 | A1* | 1/2017 | Kang | H02J 7/0091 |
| 2018/0026550 | A1* | 1/2018 | Dent | H02J 3/381 |
| | | | | 363/56.01 |
| 2019/0140452 | A1* | 5/2019 | Suzuki | H02M 7/53871 |
| 2019/0181664 | A1* | 6/2019 | Yugou | B60L 50/64 |

FOREIGN PATENT DOCUMENTS

| JP | 2007282313 A | 10/2007 |
| JP | 2009050079 | 3/2009 |
| JP | 2010022104 A | 1/2010 |
| JP | 2010130768 A | 6/2010 |
| JP | 2012019647 A | 1/2012 |
| JP | 2014117023 A | 6/2014 |
| JP | 2016052176 A | 4/2016 |
| JP | 2017034881 A | 2/2017 |
| KR | 1020140123982 A | 10/2014 |
| KR | 102010030077 A | 3/2015 |

OTHER PUBLICATIONS

Japanese Office Action for related Japanese Application No. 2020-514476; action dated Dec. 22, 2020; (3 pages).
International Search Report for related International Application No. PCT/KR2017/008352; report dated Nov. 29, 2018; (3 pages).
Written Opinion for related International Application No. PCT/KR2017/008352; report dated Nov. 29, 2018; (4 pages).

* cited by examiner

[FIG. 1]
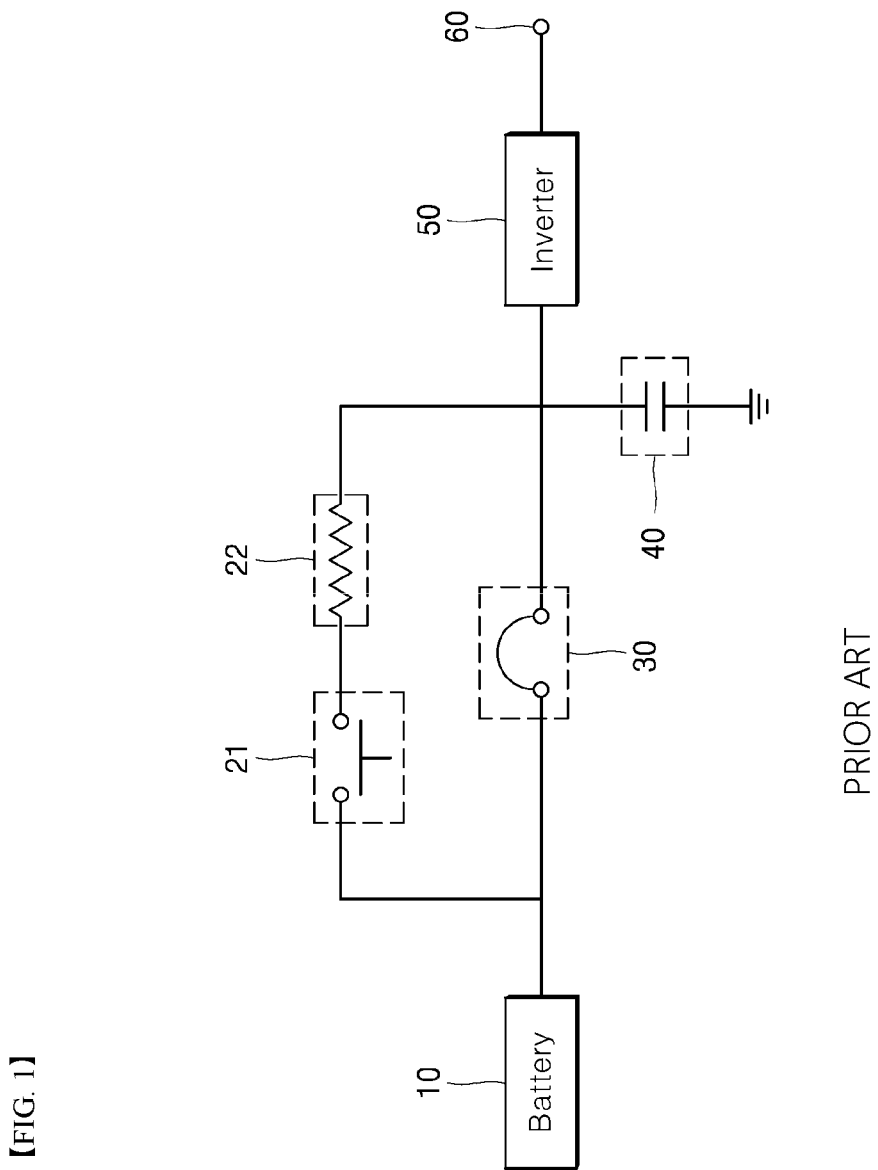
PRIOR ART

[FIG. 2]
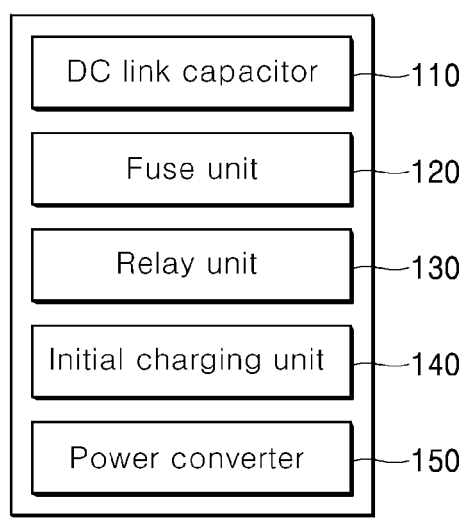

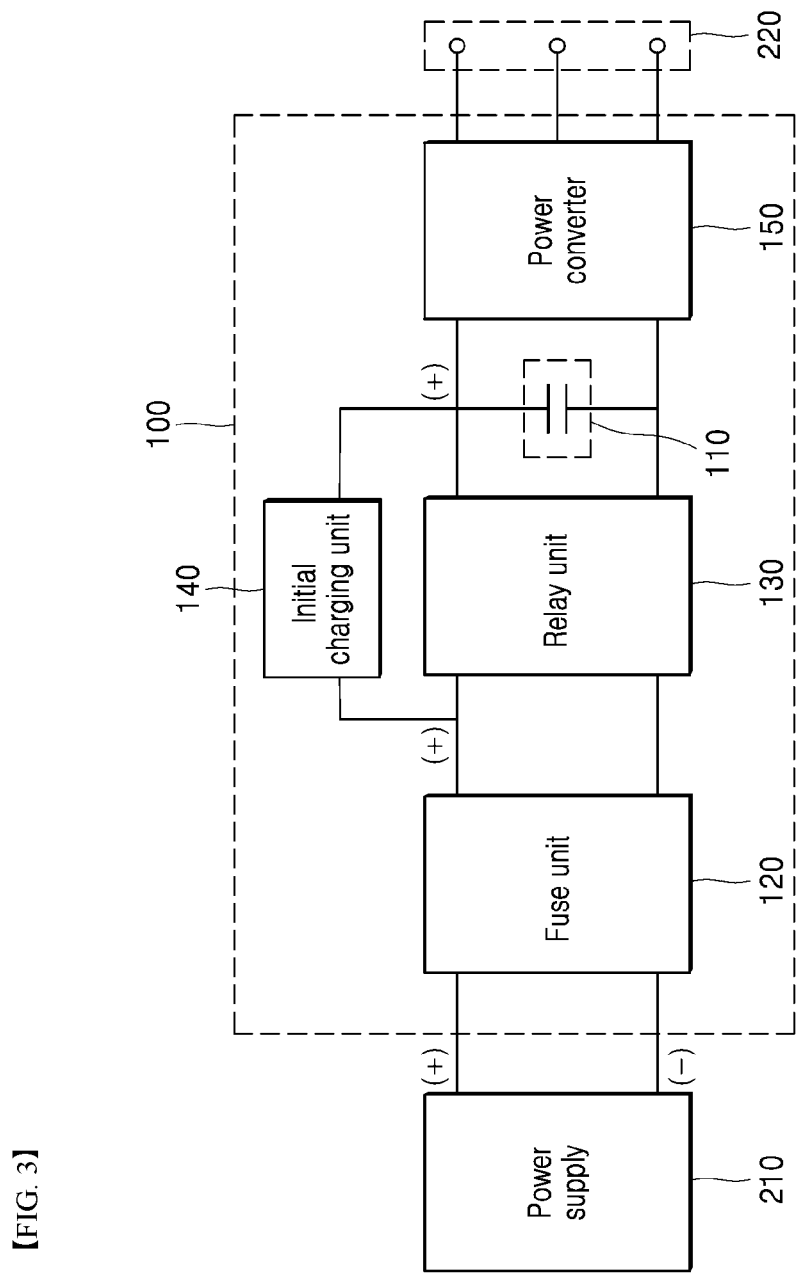
[FIG. 3]

[FIG. 4]
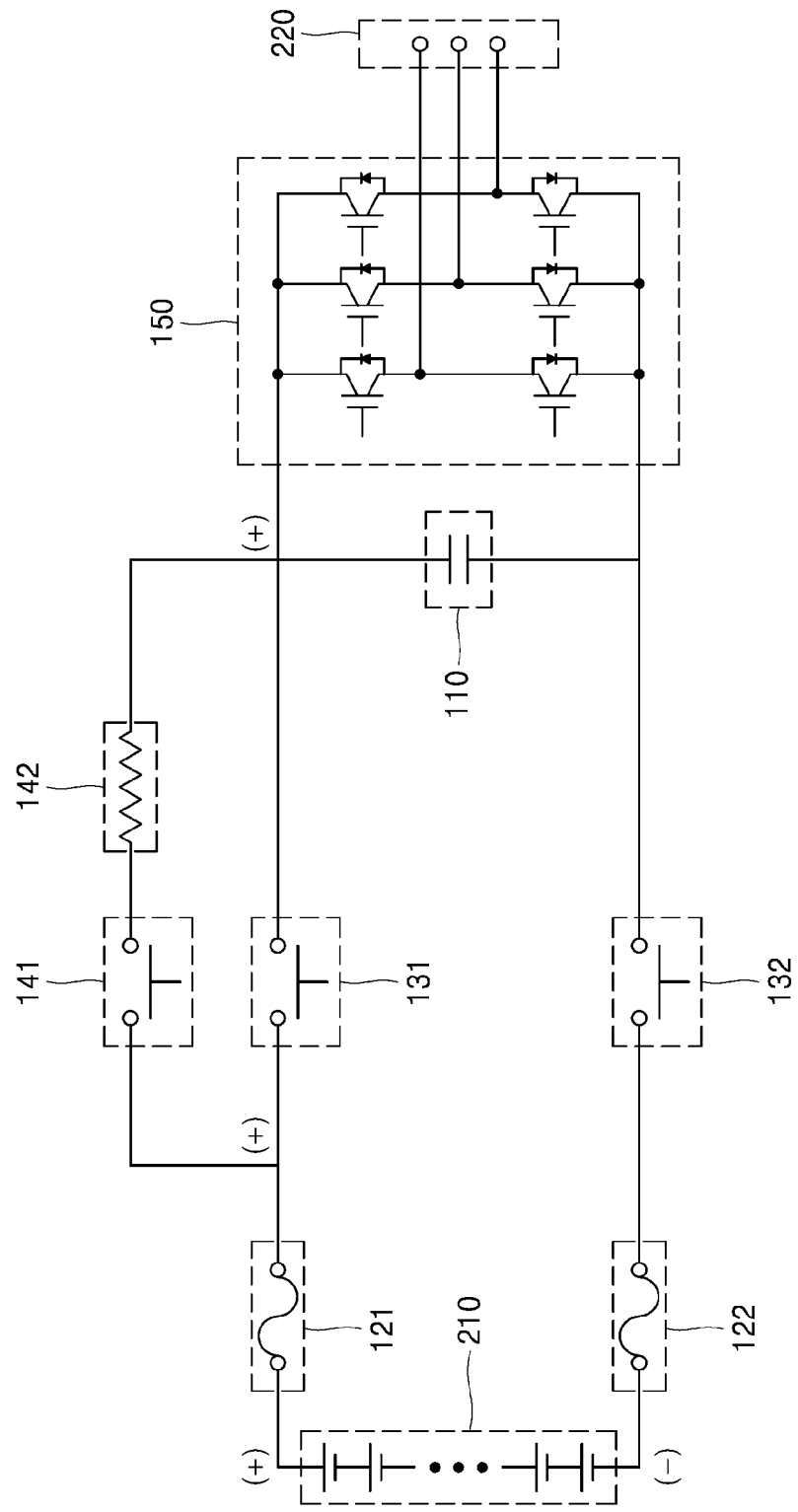

[FIG. 5]
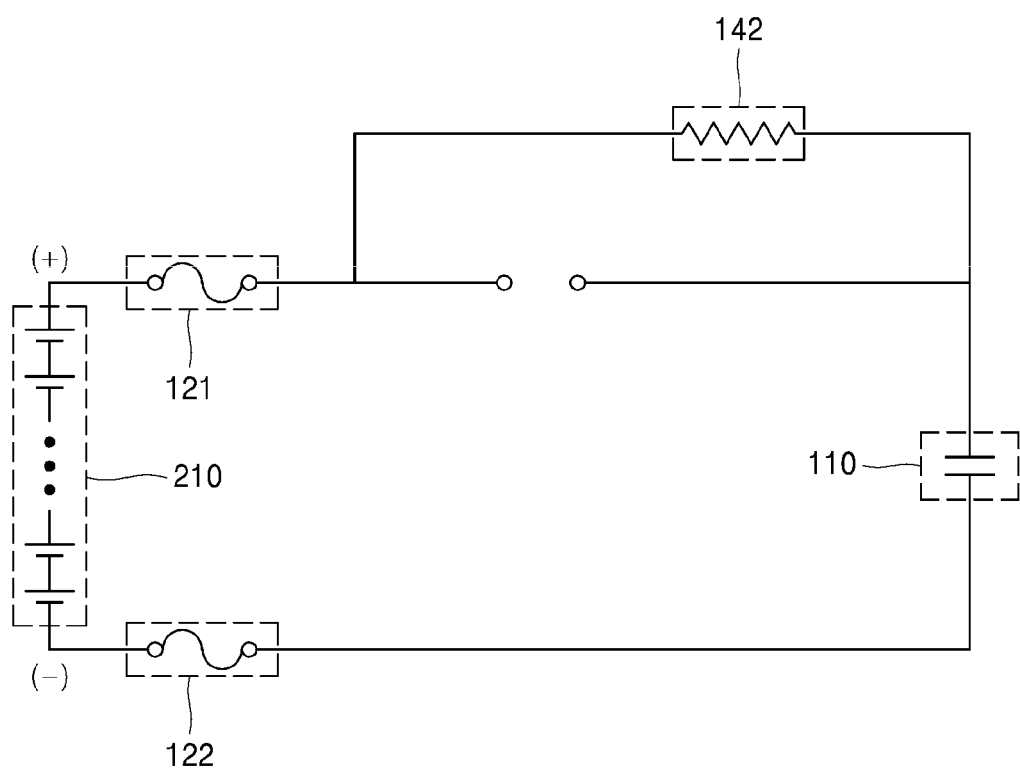

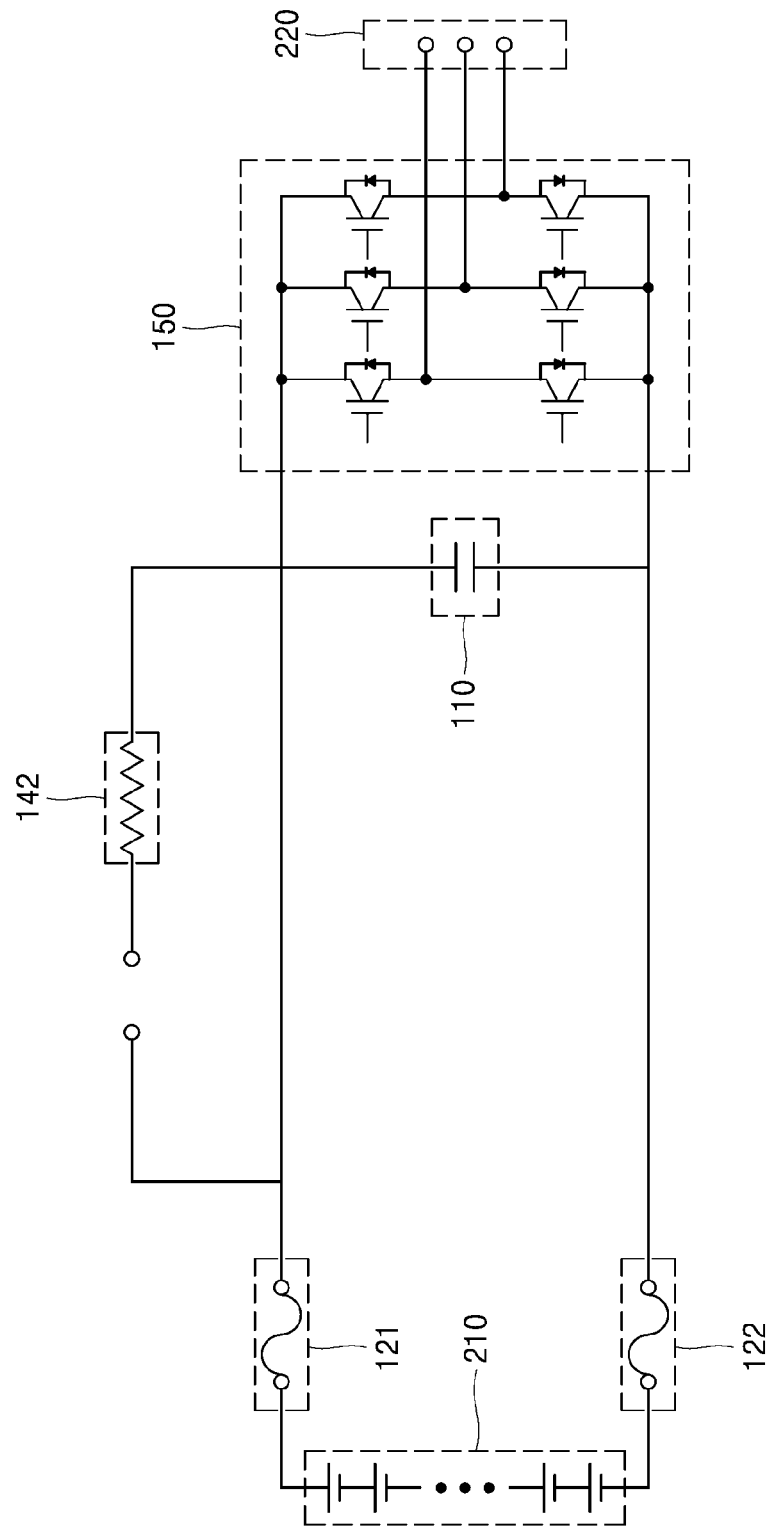
[FIG. 6]

[FIG. 7]
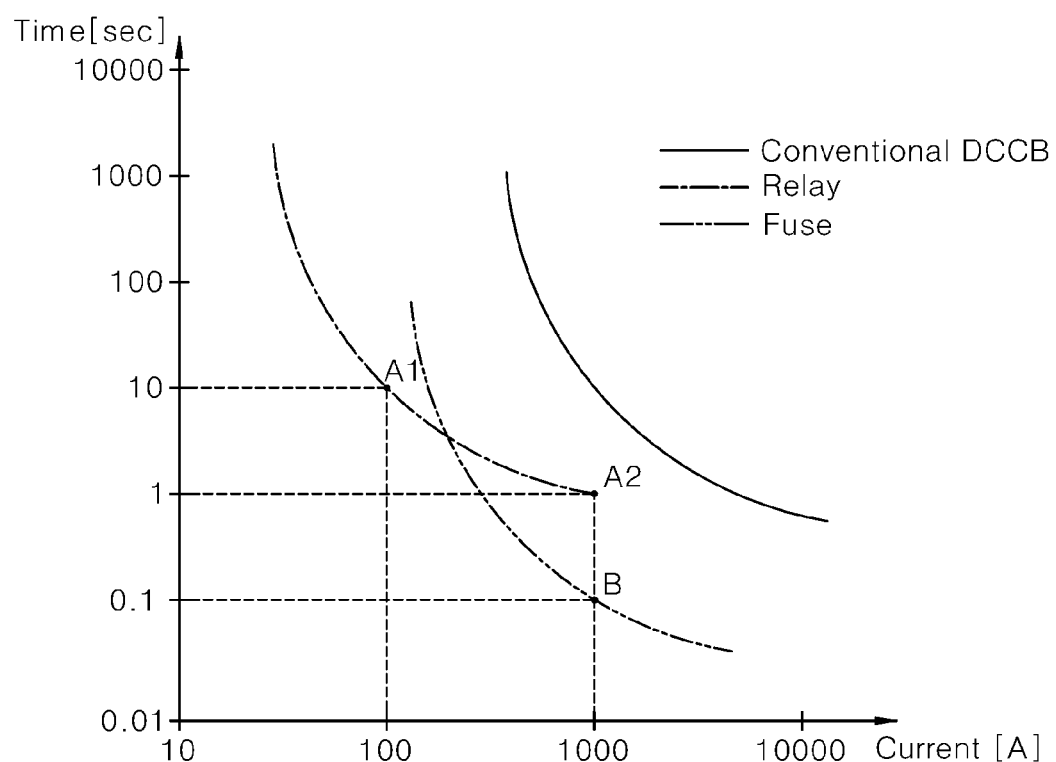

POWER CONVERSION DEVICE UTILIZING A RELAY UNIT WITH MULTIPLE RELAYS

CROSS-REFERENCE TO RELATED APPLICATIONS

The present application is a National Stage of International Application No. PCT/KR2017/008352, filed on Aug. 2, 2017, which claims the benefit of earlier filing date and right of priority to Korean Application No. 10-2017-0063280, filed on May 23, 2017, the contents of which are all hereby incorporated by reference herein in their entirety.

FIELD OF THE INVENTION

The present disclosure relates to a power conversion device. More specifically, the present disclosure relates to a power conversion device that blocks over-current using protective cooperation between a fuse and a relay.

BACKGROUND OF THE INVENTION

A power conversion device converts DC power generated from a battery or a solar cell into AC power and supplies the same to a power system and a load terminal, or converts AC power supplied from the power system into DC power and stores the same in a battery.

FIG. 1 shows a conventional power conversion device 1. Hereinafter, referring to FIG. 1, a method by which the conventional power conversion device 1 prevents over-current will be described in detail.

Referring to FIG. 1, the conventional power conversion device 1 includes a battery 10, an initial-charge relay 21, an initial-charge resistor 22, a DC circuit breaker (Direct Current Circuit Breaker; DCCB) 30, a DC link capacitor 40, and an inverter 50.

The conventional power conversion device 1 turns on and off the initial-charge relay 21 and the DC circuit breaker 30 respectively to charge the DC link capacitor 40 with the DC power of the battery 10. More specifically, the power conversion device 1 charges the DC link capacitor 40 by supplying the DC power of the battery 10 dropped through the initial-charge resistor 22 to the DC link capacitor 40.

The conventional power conversion device 1 then turns off and on the initial-charge relay 21 and the DC circuit breaker 30 respectively, and provides a PWM (pulse width modulation) signal to the inverter 50 to convert power from the battery 10 to an AC power and supply the AC power to a load terminal 60.

In this connection, the DC circuit breaker 30 measures a magnitude of the DC current output from battery 10. If the magnitude of the measured current is greater than or equal to a certain magnitude, the DC circuit breaker 30 blocks the corresponding current so that no over-current is supplied to the load terminal 60.

However, the DC circuit breaker 30 used in the conventional power conversion device 1 has a large size and a very expensive price. In addition, a large-capacity power conversion device 1 uses the DC circuit breaker 30 with automatic on/off operation. In order to control such a DC circuit breaker 30, an expensive motor operator must be additionally provided, thereby increasing an overall system construction cost.

BRIEF SUMMARY OF THE INVENTION

One purpose of the present disclosure is to provide a power conversion device in which a conventional DC circuit breaker is replaced with fuses and relays with different blocking characteristics to reduce a cost of constructing a circuit and reduce a size of the circuit.

Further, another purpose of the present disclosure is to provide a power conversion device in which a relay performing a blocking operation of an over-current from a power supply is different from a relay performing a blocking operation of an over-current from a load terminal, thereby to reduce the number of blockings by each relay.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a power conversion device including: a DC link capacitor charged by direct current (DC) power supplied from a power supply; a fuse unit connected to an output of the power supply, wherein the fuse unit is configured for blocking a current output from the power supply or to be supplied to the power supply and having a magnitude greater than or equal to a first blocking magnitude; a relay unit including a first relay connecting a positive terminal of the fuse unit and a positive terminal of the DC link capacitor, and a second relay connecting a negative terminal of the fuse unit and a negative terminal of the DC link capacitor; an initial charging unit connected in parallel with the first relay, wherein the initial charging unit is configured to charge the DC link capacitor with the DC power supplied from the power supply; and a power converter configured to convert the DC power from the power supply into AC power when the DC link capacitor has been charged, and to supply the converted AC power to a load terminal.

In accordance with the present disclosure, a conventional DC circuit breaker is replaced with fuses and relays with different blocking characteristics to reduce a cost of constructing a circuit and reduce a size of the circuit.

Further, in accordance with the present disclosure, a relay performing a blocking operation of an over-current from a power supply is different from a relay performing a blocking operation of an over-current from a load terminal, thereby to reduce the number of blockings by each relay.

BRIEF DESCRIPTION OF DRAWINGS

FIG. 1 shows a conventional power conversion device.

FIG. 2 is a schematic diagram of a power conversion device according to one embodiment of the present disclosure.

FIG. 3 is a schematic diagram showing a configuration of the power conversion device shown in FIG. 2.

FIG. 4 is a circuit diagram of the power conversion device shown in FIG. 2.

FIG. 5 shows charging of a DC link capacitor with DC power supplied from a power supply.

FIG. 6 shows converting of DC power supplied from a power supply into AC power and suppling the AC power to a load terminal.

FIG. 7 is a graph showing blocking characteristics (time-current curve) of a fuse and a relay according to an embodiment of the present disclosure.

DETAILED DESCRIPTION OF THE INVENTION

The above objects, features and advantages are described in detail below with reference to the accompanying drawings. Accordingly, a person having ordinary knowledge in the technical field to which the present disclosure belongs may easily implement a technical idea of the present disclosure. In describing the present disclosure, when it is determined that detailed descriptions of known components and methods related to the present disclosure may unnecessarily obscure a gist of the present disclosure, the detailed descriptions thereof will be omitted. Hereinafter, exemplary embodiments of the present disclosure will be described in detail with reference to the accompanying drawings. In the drawings, the same reference numerals are used to indicate the same or similar components.

FIG. 2 is a schematic diagram of a power conversion device 100 according to one embodiment of the present disclosure. Referring to FIG. 2, the power conversion device 100 according to an embodiment of the present disclosure may include a DC link capacitor 110, a fuse unit 120, a relay unit 130, an initial charging unit 140, and a power converter 150. The power conversion device 100 shown in FIG. 2 is based on one embodiment. Thus, components thereof are not limited to the embodiment shown in FIG. 2. Some components may be added, changed, or deleted as necessary.

FIG. 3 is a schematic diagram showing a configuration of the power conversion device 100 shown in FIG. 2. FIG. 4 is a circuit diagram of the power conversion device 100 shown in FIG. 2. Hereinafter, the power conversion device 100 and components thereof will be described in detail with reference to FIGS. 2 to 4.

Referring to FIG. 3, the DC link capacitor 110 may be charged with DC power supplied from the power supply 210. The power supply 210 may refer to means for supplying the DC power, and may include a battery, a fuel cell, a solar cell, and the like.

The DC link capacitor 110 may store the DC power supplied from the power supply 210 in a form of a voltage of a certain magnitude in order to supply a DC voltage to the power converter 150 as described later.

To this end, the device 100 may further include a boost-up/drop-down circuit, that is, a DC/DC converter, a switching regulator and the like between the DC link capacitor 110 and the power supply 210. In this connection, the DC link capacitor 110 may smooth an output voltage output from the DC/DC converter, switching regulator, or the like to store therein a voltage of a certain magnitude.

The fuse unit 120 is connected to an output of the power supply 210 and may block a current having a magnitude equal to or above a first blocking magnitude that is output from or is to be supplied to the power supply 210. In other words, the fuse unit 120 may block the corresponding current when a magnitude of the current flowing in the fuse unit 120 is greater than or equal to the first blocking magnitude.

In this connection, the first blocking magnitude may be determined based on blocking characteristics of the fuse unit 120. The blocking characteristic will be described later.

The fuse unit 120 may be configured to include one or more fuses that are blown by heat generated by the corresponding current having a magnitude equal to or above a certain magnitude. Referring to FIG. 4, the fuse unit 120 may include a first fuse 121 in series with a positive terminal (+) of the power supply 210 and a second fuse 122 in series with a negative terminal (−) of the power supply 210.

Accordingly, the first fuse 121 may be blown when a magnitude of the current flowing through the first fuse 121 is equal to or greater than the first blocking magnitude. Further, the second fuse 122 may be blown when a magnitude of the current flowing through the second fuse 122 is greater than or equal to the first blocking magnitude.

Each of the first fuse 121 and the second fuse 122 as described above may be embodied as a DC fuse or an AC fuse. However, since the fuse unit 120 is connected in series with the power supply 210 for supplying the DC power, each of the first fuse 121 and second fuse 122 may be preferably a DC fuse.

Referring back to FIG. 4, the relay unit 130 may include a first relay 131 for connecting a positive terminal of the fuse unit 120 and a positive terminal of the DC link capacitor 110 with each other and a second relay 132 for connecting a negative terminal of the fuse unit 120 and a negative terminal of the DC link capacitor 110 with each other.

The first relay 131 and the second relay 132 may contain an electromagnet, for example a coil, therein and may be turned on or off by a magnetic field generated from the electromagnet. Since the electromagnet is generated by an excitation signal provided from a control module (not shown), an operation state of each of the relays constituting the relay unit 130 may be controlled by the control module.

In one example, the relay unit 130 may block a current having a magnitude above or equal to a second blocking magnitude flowing in the first relay 131 or the second relay 132 regardless of control from the control module.

In other words, the first relay 131 may block the corresponding current when a magnitude of the current flowing through the first relay 131 is greater than or equal to the second blocking magnitude. Further, the second relay 132 may block the corresponding current when a magnitude of the current flowing through the second relay 132 is greater than or equal to the second blocking magnitude.

The relay unit 130 may automatically block the corresponding current when a magnitude of the current flowing through the relay unit 130 is greater than or equal to the second blocking magnitude.

When the power supply 210 supplies the DC power, a blocking capacity and a number of times of blocking by each relay based on a current direction may be limited. Accordingly, the second blocking magnitude in accordance with the present disclosure may be determined based on a blocking capacity by each relay.

Referring back to FIG. 4, when an initial-charge relay 141 to be described later is turned off, and when at least one of the first relay 131 and the second relay 132 is turned off, the power supply 210 and the DC link capacitor 110 may be disconnected from each other.

Accordingly, in order to reduce the number of blockings by each relay, the first relay 131 may block a current having a magnitude higher than or equal to the second blocking magnitude as supplied from the power supply 210. In one example, the second relay 132 may block a current having a magnitude greater than or equal to the second blocking magnitude to be supplied to the power supply 210, that is, as supplied from the load terminal 220.

In other words, when the magnitude of the current supplied from the power supply 210 is greater than or equal to the second blocking magnitude, the current may be blocked only by the first relay 131. When the magnitude of the current to be supplied to the power supply 210 is greater than or equal to the second blocking magnitude, the current may be blocked only by the second relay 132.

As described above, in accordance with the present disclosure, the device 100 may reduce the number of blockings by each relay by differentiating between the relay performing the blocking operation of the over-current generated from the power supply 210 and the relay performing the blocking operation of the over-current generated from the load terminal 220.

Referring back to FIG. 3 and FIG. 4, the initial charging unit 140 is connected in parallel with the first relay 131 and may charge the DC link capacitor 110 with the DC power supplied from the power supply 210.

When the DC link capacitor 110 is not charged, the power supplied to the load terminal 220 may be unstable. Accordingly, the initial charging unit 140 may charge the DC link capacitor 110 before the power converter 150 as described later supplies power to the load terminal 220.

FIG. 5 shows the charging of the DC link capacitor 110 with the DC power supplied from the power supply 210. Hereinafter, a process of charging the DC link capacitor 110 by the initial charging unit 140 will be described in detail with reference to FIGS. 3 to 5.

The initial charging unit 140 may charge the DC link capacitor 110 with the DC power supplied from the power supply 210 when the first relay 131 is turned off and the second relay 132 is turned on. As described above, a voltage of a certain magnitude may be stored in the DC link capacitor 110. In this connection, the certain magnitude may be lower than a DC voltage supplied from the power supply 210.

Accordingly, as shown in FIG. 4, the initial charging unit 140 may include an initial-charge relay 141 to block the DC power supplied from the power supply 210, and an initial-charge resistor to drop a magnitude of the DC power supplied from the power supply 210 142.

In this connection, the initial-charge relay 141 may include an electromagnet, for example, a coil, as in the first relay 131 and second relay 132 and may be turned on or off by the magnetic field generated by the electromagnet. Since the electromagnet is generated by the excitation signal provided from the control module, the operating state of the initial-charge relay 141 may be controlled by the control module.

When the first relay 131 and second relay 132 are turned off and on respectively, and the initial-charge relay 141 is turned on, and power is not applied to the power converter 150 to be described later, the circuit shown in FIG. 4 may be represented as shown in FIG. 5.

In this connection, the DC power supplied from the power supply 210 may be dropped by the initial-charge resistor 142 and then may be applied to the DC link capacitor 110. Accordingly, a magnitude of the voltage applied to the DC link capacitor 110 may be controlled by adjusting a magnitude of a resistance of the initial-charge resistor 142.

Referring back to FIG. 3 and FIG. 4, when the DC link capacitor 110 has been charged, the power converter 150 may convert the DC power supplied from the power supply 210 into AC power and supply the AC power to the load terminal 220.

As shown in FIG. 4, the power converter 150 may convert the DC power supplied from the voltage source into AC power according to the PWM (pulse width modulation) control of the control module. To this end, the power converter 150 may include a plurality of power switching elements for performing switching operations according to the PWM control. The switching element may be embodied as an IGBT (Insulated Gate Bipolar Transistor) in one example.

The DC voltage charged in the DC link capacitor 110 may be converted into AC power by the power converter 150 and then the AC power may be supplied to the load terminal 220.

In this connection, the load terminal 220 may be connected to a system in which power is used, for example, a load.

FIG. 6 shows a scheme in which DC power supplied from the power supply 210 is converted into AC power and then, AC power is supplied to the load terminal 220. Hereinafter, the process of supplying the AC power to the load terminal 220 by the power converter 150 will be described in detail with reference to FIGS. 4 and 6.

When the above-described DC link capacitor 110 has been charged, the initial-charge relay 141 may be turned off and the first relay 131 may be turned on.

More specifically, as shown in FIG. 5, when the DC link capacitor 110 is being charged, the initial-charge relay 141 may be turned on and the first relay 131 may be turned off.

In this connection, the control module measures a voltage of the DC link capacitor 110. When the measured voltage reaches a certain voltage, the control module may block the excitation signal to be provided to the initial-charge relay 141 and may provide the excitation signal to the first relay 131. Accordingly, the initial-charge relay 141 may be turned off and the first relay 131 may be turned on.

When the initial-charge relay 141 is turned off and the first relay 131 and second relay 132 are turned on, the circuit shown in FIG. 4 may be changed into as shown in FIG. 6. The power converter 150 may convert the DC voltage stored in the DC link capacitor 110 into a three-phase AC power and supply the AC power to the load terminal 220.

Referring to FIG. 4 to FIG. 6 again to summarize the above description, first, the initial-charge relay 141 and second relay 132 are turned on, and the first relay 131 is turned off to charge the DC link capacitor 110 with the DC power supplied from the power supply 210.

When the DC link capacitor 110 has been charged, the initial-charge relay 141 is turned off, and the first relay 131 is turned on. Then, the power converter 150 converts the DC power supplied from the power supply 210 into AC power via the PWM switching control and supplies the AC power to the load terminal 220.

In one example, the device in accordance with the present disclosure may further include an AC fuse unit (not shown) that is connected in series to and disposed between the power converter 150 and load terminal 220, and blocks a current having a magnitude equal to or greater than a third blocking magnitude, as supplied from the load terminal 220.

In this connection, the third blocking magnitude may be determined based on blocking characteristics of each of fuses constituting the AC fuse unit. The blocking characteristic will be described later.

The AC fuse unit may include one or more AC fuses. More specifically, the AC fuse unit may include three AC fuses connected to and disposed between the output of the power converter 150 and the load terminal 220 as shown in FIG. 4.

For example, each AC fuse may be located in each of U phase, V phase, and W phase lines for connecting the power converter 150 and the load terminal 220 with each other. When an AC current having a magnitude above or equal to a certain magnitude flows through each AC fuse, each AC fuse may be blown by heat generated by the corresponding current. Accordingly, each AC fuse may be blown when a magnitude of the AC current flowing through each AC fuse is greater than or equal to a third blocking magnitude.

As described above, since the over-current output from the power supply 210 is blocked by the fuse unit 120 and the relay unit 130, the AC current blocked by the AC fuse unit may be over-current supplied from the load terminal.

FIG. 7 is a graph showing blocking characteristics (time-current curve) of a fuse and a relay according to an embodiment of the present disclosure. Hereinafter, referring to FIG. 4, FIG. 6 and FIG. 7, a process in which the fuse unit 120 and relay unit 130 block the over-current based on the blocking characteristics of the fuse and relay will be described in detail.

As described above, the fuse unit 120 may block a current having a magnitude equal to or above first blocking magnitude. The relay unit 130 may block a current having a magnitude equal to or above the second blocking magnitude. In this connection, the first blocking magnitude may be determined based on the blocking characteristics of the fuse unit 120, while the second blocking magnitude may be determined based on the blocking characteristic of the relay unit 130.

Referring to FIG. 7, the blocking characteristics of the fuse and relay may be represented as a graph of a blocking time based on a magnitude of a current. Referring to the blocking characteristic graph of the fuse and the relay, the magnitude of the current as blocked by the fuse and the relay may not be constant. In other words, the aforementioned first blocking magnitude and second blocking magnitude are not specific magnitudes and may vary based on the blocking time.

For example, referring to the blocking characteristic curve of the relay, when the second blocking magnitude is 100 [A], the relay may block the corresponding current in at least 10 [sec] (A1). When the second blocking magnitude is 1000 [A], the relay may block the corresponding current in at least 1 [sec] (A2).

In other words, when a current of 100 [A] flows in the relay for more than 10 seconds, the relay may block the current of 100 [A]. Further, when a current of 1000 [A] flows in the relay for more than 1 second, the relay may block the current of 1000 [A]. Accordingly, an upper right region of each blocking characteristic graph shown in FIG. 7 may be a blocking region.

The device in accordance with the present disclosure may perform protective cooperation between the relays and fuses with different blocking characteristics.

More specifically, as shown in FIG. 7, the blocking region by the combination of the fuse and the relay in accordance with the present disclosure may contain an entirety of a blocking region of the conventional DC circuit breaker (Direct Current Circuit Breaker).

Accordingly, the device in accordance with the present disclosure may not only block all currents in the region blocked by the conventional DC circuit breaker, but may also block currents faster than the conventional DC circuit breaker.

As described above, when the initial-charge relay 141 shown in FIG. 4 is turned off, and the first relay 131 and the second relay 132 are turned on, the DC power supplied from the power supply 210 may be converted into AC power which in turn may be supplied to the load terminal 220 as shown in FIG. 6.

In this connection, magnitudes of the currents flowing through the first fuse 121 and the first relay 131 connected in series with each other may be the same. Further, magnitudes of the currents flowing through the second fuse 122 and second relay 132 connected in series with each other may be the same.

When 100 [A] current flows in the first fuse 121 and first relay 131 due to over-current output from the power supply 210 or suppled from the load terminal 220, the blocking time by the relay is earlier than the blocking time by the fuse, as shown in FIG. 7, such that the relay may block the corresponding current 10 seconds since the corresponding current flows (A1).

On the other hand, when current of 1000 [A] flows in the first fuse 121 and the first relay 131 due to over-current output from the power supply 210 or supplied from the load terminal 220, the blocking time by the fuse is earlier than the blocking time by the relay as shown in FIG. 7. Thus, in 0.1 second since the current flows, the fuse may block the current (B).

In one example, as described above, the first fuse 121 and first relay 131 may block only the over-current output from the power supply 210, while the second fuse 122 and the second relay 132 may only block the over-current output from the load terminal 220.

In this case, when over-current is output from the power supply 210, only the first fuse 121 and the first relay 131 may perform the above-described protective cooperation function. On the contrary, when the over-current is output from the load terminal 220, only the second fuse 122 and the second relay 132 may perform the above-described protective cooperation function.

In summary, when an abnormal state occurs in the load terminal 220 or power supply 210 and thus the over-current occurs, the current blocking operation by the conventional DC circuit breaker may be implemented by the protective cooperation between the relay unit 130 and fuse unit 120.

More specifically, when the over-current occurs in the power supply 210 as described above, the current blocking operation may be performed by the protective cooperation between the first fuse 121 and the first relay 131. When the over-current occurs in the load terminal 220, the current blocking operation may be performed by the protective cooperation between the second fuse 122 and the second relay 132.

As described above, in accordance with the present disclosure, a conventional DC circuit breaker is replaced with fuses and relays with different blocking characteristics to reduce a cost of constructing a circuit and reduce a size of the circuit.

The present disclosure as described above may be subjected to various substitutions, modifications, and changes by a person having ordinary knowledge in the technical field to which the present disclosure belongs without departing from the technical spirit of the present disclosure. Thus, the present disclosure is not limited by the accompanying drawings.

What is claimed is:

1. A power conversion device including:
   a DC link capacitor charged by direct current (DC) power supplied from a power supply;
   a fuse unit connected to an output of the power supply, wherein the fuse unit is configured for blocking a current output from the power supply or to be supplied to the power supply and having a magnitude greater than or equal to a first blocking magnitude;
   a relay unit including a first relay connecting a positive terminal of the fuse unit and a positive terminal of the DC link capacitor, and a second relay connecting a negative terminal of the fuse unit and a negative terminal of the DC link capacitor;
   an initial charging unit connected in parallel with the first relay, wherein the initial charging unit is configured to charge the DC link capacitor with the DC power supplied from the power supply; and
   a power converter configured to convert the DC power from the power supply into AC power when the DC link capacitor has been charged, and to supply the converted AC power to a load terminal, wherein the relay unit is configured to block a current flowing in the first relay or the second relay and having a magnitude equal to or greater than a second blocking magnitude, wherein the first relay is configured to block only a current supplied from the power supply and having a magnitude equal to or greater than the second blocking magnitude, wherein the second relay is configured to block only a current to be supplied to the power supply and having a magnitude equal to or greater than the second blocking magnitude.

2. The power conversion device of claim 1, wherein the fuse unit includes:

a first fuse in series with a positive terminal of the power supply; and a second fuse in series with a negative terminal of the power supply.

3. The power conversion device of claim 1, wherein the first blocking magnitude is determined based on blocking characteristics of the fuse unit, wherein the second blocking magnitude is determined based on blocking characteristics of the relay unit.

4. The power conversion device of claim 1, wherein when the first relay is turned off and the second relay is turned on, the initial charging unit is configured to charge the DC link capacitor with the DC power supplied from the power supply.

5. The power conversion device of claim 1, wherein the initial charging unit includes:

an initial-charge relay configured to block the DC power supplied from the power supply; and an initial-charge resistor configured to drop a magnitude of the DC power supplied from the power supply.

6. The power conversion device of claim 5, wherein when the DC link capacitor has been charged, the initial-charge relay is turned off and the first relay is turned on.

7. The power conversion device of claim 1, wherein the power conversion device further include an AC fuse unit connected in series to and disposed between the power converter and the load terminal, wherein the AC fuse unit is configured for blocking a current supplied from the load terminal and having a magnitude greater than or equal to a third blocking magnitude.

* * * * *